United States Patent [19]

Jaspers

[11] Patent Number: 4,723,170
[45] Date of Patent: Feb. 2, 1988

[54] CAMERA FOR RECORDING TELEVISION, PHOTOGRAPHIC OR CINEMATOGRAPHIC IMAGES

[75] Inventor: Cornelis A. M. Jaspers, Eindhoven, Netherlands

[73] Assignee: U.S. Philips Corporation, New York, N.Y.

[21] Appl. No.: 870,676

[22] Filed: Jun. 4, 1986

[30] Foreign Application Priority Data

Jun. 6, 1985 [NL] Netherlands ............... 8501635

[51] Int. Cl.⁴ .................. H04N 5/16; H04N 5/228
[52] U.S. Cl. ............................ 358/221; 358/213.16
[58] Field of Search .......... 358/221, 212, 213.15, 358/213.16, 213.25

[56] References Cited

U.S. PATENT DOCUMENTS

| | | | |
|---|---|---|---|
| 3,824,337 | 7/1974 | Sangster et al. | 178/7.1 |
| 4,010,319 | 3/1977 | Levine | 358/213 |
| 4,399,466 | 8/1983 | Stephenson | 358/221 |
| 4,516,172 | 5/1985 | Miyata et al. | 358/221 |
| 4,553,169 | 11/1985 | Yoshioka et al. | 358/221 |
| 4,567,524 | 1/1986 | Levine | 358/213 |
| 4,599,654 | 7/1986 | Monroe | 358/221 |
| 4,644,403 | 2/1987 | Sakai et al. | 358/213 |
| 4,649,430 | 3/1987 | Hynecek | 358/221 |

FOREIGN PATENT DOCUMENTS 59-181877 10/1984 Japan ..................... 358/221

OTHER PUBLICATIONS

"The Frame-Transfer Sensor—An Attractive Alternative to the TV Camera Tube," *Philips Technical Publication* 150 (1985).

*Primary Examiner*—Jin F. Ng
*Assistant Examiner*—Stephen Brinich
*Attorney, Agent, or Firm*—Marc D. Schechter

[57] ABSTRACT

To realize a camera with both an undisturbed scene recording and automatic adjustments which are periodically effected while using one and the same image sensor (1), this sensor is formed as a charge transfer device comprising a pick-up member (I), a storage member (S) and a shift register member (SR). To perform a black level setting (9, 11) in the scene picture signal an opaque strip (BS) is provided on the pick-up member (I). Automatic adjustments for, for example, lens focus (FC) and white balance (WB) in color recording are accurately performed when the image sensor, beyond a scene picture information integration period and a subsequent charge transfer period between pick-up member and storage member, is operative in an adjustment action information integration period and a subsequent charge transfer period so that a signal is obtained at the sensor output terminal (R,G,B) with sequentially the adjustment action information and the associated dark current information for a separate black level control circuit (10, 12). The adjustment action information can thereby be accurately determined for the relevant adjustment as the associated dark current information is automatically obtained.

8 Claims, 4 Drawing Figures

CAMERA FOR RECORDING TELEVISION, PHOTOGRAPHIC OR CINEMATOGRAPHIC IMAGES

BACKGROUND OF THE INVENTION

The invention relates to a camera for recording television, photographic or cinematographic images, including a solid-state image sensor designed as a charge transfer device. The charge transfer device comprises a pick-up member, a storage member and a parallel-in, series-out shift register member coupled to at least one sensor output terminal. The storage and shift register members are shielded from incident light, and the pick-up member is shielded over a strip from incident light. The camera has a control circuit for the image sensor for obtaining at the sensor output terminal a picture signal having a periodical picture information associated with a scene to be recorded and a dark current information originating from below the said strip. The picture signal is obtained after a picture information integration period in the pick-up member and a charge transfer period for the transfer between pick-up member and storage member.

A camera of this type, particularly for television has been described in an English language technical publication no. 150 of the Philips Electronics Components and Materials Division, issued on Jan. 11, 1985, in which the solid-state image sensor is designed as a so-called frame-transfer sensor which is mentioned as an attractive alternative to the television camera tube. In the case of a colour recording based on the three primary colours, the shift register member has three parallel shift registers each applying a picture signal corresponding to a colour to one of three output terminals. The dark current information originating from below the said shielding strip in the pick-up member occurs in all three picture signals.

Apart from an embodiment of the control circuit for the image sensor, the said publication does not provide any circuit information relating to the required adjustments in the camera. Such adjustments are aimed at, for example, camera lens focusing, picture signal black level setting for which the dark current information is utilized, white balance setting in colour recording with three picture signals, etc.

SUMMARY OF THE INVENTION

It is an object of the invention to provide a camera including the described solid-state image sensor with automatic adjustments influencing the normal picture signal generation as little as possible and being periodically performed in the correct manner. To this end a camera according to the invention is characterized in that beyond the said picture information integration period and subsequent charge transfer period and after an adjustment action information integration period in the pick-up member, the control circuit for the image sensor is operative for obtaining at the sensor output terminal a signal having sequentially the adjustment action information and the associated dark current information.

Thus it is achieved that with an acceptable decrease of the picture information integration period the result of the adjustment action can be determined in an accurate manner from the obtained adjustment action information and its own associated dark current information. In fact, as is required for performing a current black-level clamping, this dark current information of its own is more or less proportional to the period when the adjustment action information is present in the pick-up member. It is then possible within a maximum possible period to select the integration period for the adjustment action information in a flexible manner and as desired, while its own dark current information is automatically obtained.

An embodiment of a camera according to the invention in which a desired information addition is present after the adjustment action information integration period and which leads to a minimum possible decrease of the picture information integration period is characterized in that in the camera having a time signal generator comprising the control circuit for applying distinct clock pulse signals to various outputs for the information transfer in and between the parts of the image sensor, the pick-up member and the storage member are coupled to distinct clock pulse outputs during a transfer period with an information transfer between the pick-up member and the storage member, said period succeeding the adjustment action information integration period, the frequency of the clock pulses for the information transfer in the pick-up member being a factor higher than that in the storage member during at least part of the transfer period, the information between the pick-up member and the storage member being transferred under the control of the clock pulses for the information transfer in the storage member.

In this case the information may be added for the adjustment action information and for the dark current information to the same or a different extent dependent on a constant or changing factor, respectively.

In order to generate a picture signal and a signal with the adjustment action information, which do not disturb each other, an embodiment of a camera is characterized in that the camera has a period setting circuit through which the control circuit for the image sensor is operative for generating the picture information or for generating the adjustment action information, both with the associated dark current information generation, said period setting circuit having an input for applying a television field or picture synchronising signal, respectively.

In order to obtain an optimally separate signal processing relating to the picture information and the adjustment action information, an embodiment of the camera is characterized in that at least one sensor output terminal is alternately coupled to a first black level control circuit for the picture signal and to a second black level control circuit for the signal comprising the adjustment action information and the associated dark current information.

In order to perform a given camera adjustment an embodiment of the camera is characterized in that a focus control circuit succeeds the second black level control circuit for the said signal for automatically adjusting an optical lens system present at the camera and being positioned in front of the pick-up member of the image sensor.

For a further camera adjustment an embodiment of the camera is characterized in that in the camera suitable for colour recording a white balance control circuit succeeds the second black level control circuit for the said signal, which white balance control circuit has a storage circuit for the amplification factors for an adjustable amplifier which succeeds the first black level control circuit for the picture signal.

BRIEF DESCRIPTION OF THE DRAWING

The invention will be described in greater detail by way of example with reference to the accompanying drawing in which.

DESCRIPTION OF THE PREFERRED EMBODIMENTS

Figure 1:
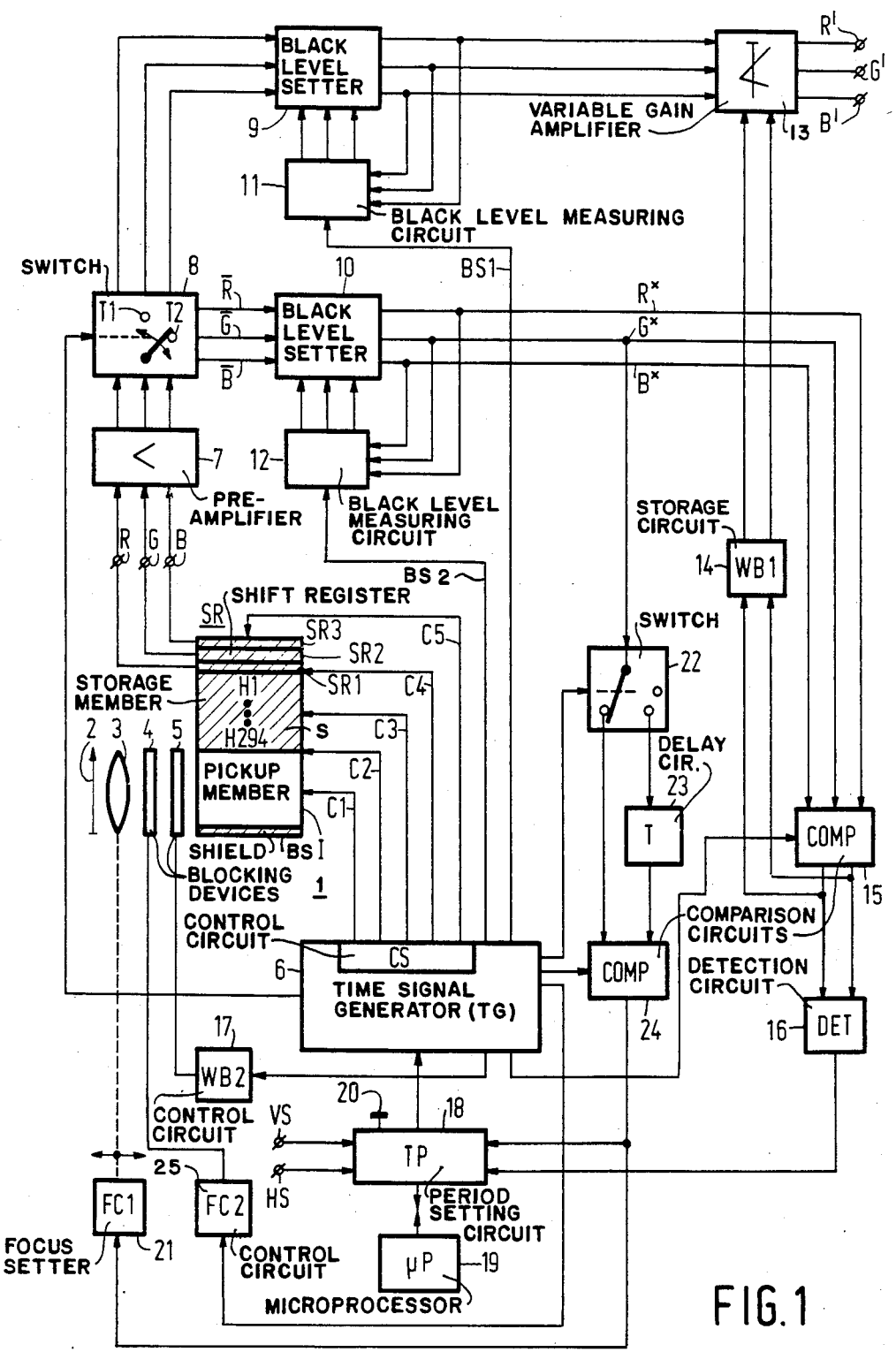
FIG. 1 is a block diagram of an embodiment of a camera according to the invention.

In the camera according to the invention, which is shown in a block diagram in FIG. 1, reference numeral 1 denotes a solid-state image sensor, which, as is illustrated by means of a block diagram, is in the form of a charge transfer device, more specifically as what is commonly referred to as a frame transfer device. The sensor 1 is in the form of an integrated circuit comprising a pick-up member I, an adjacent storage member S, which is shielded from light, and adjacent thereto a parallel-in series-out shift register member SR, which is also shielded from light and has three output shift registers SR1, SR2 and SR3. The light shields are shaded in FIG. 1 in which furthermore the pick-up member I is provided with a strip-shaped shield BS.

The construction and the operation under the control of clock pulse signals to be applied is described in detail in U.S. Pat. No. 3,824,337, which is included herein by reference.

The pick-up member I and the storage member S are constructed from pick-up and storage elements, respectively, which are arranged in rows and columns, a charge transfer occurring periodically in the column direction in the members I and S and between them. In FIG. 1, H1 ... H294 in the storage member S denotes that it is assumed to comprise 294 rows of storage elements, which corresponds to 294 television lines H. The pick-up member I is also of a construction having 294 rows of pick-up elements. Instead of providing the row of storage elements H1 in the storage member S, it is alternatively possible to use the shift register member SR for that purpose as described in said patent.

Instead of the described construction of the sensor 1 with the adjacent members I, S and SR, a storage member S arranged in the integrated circuit under the pick-up member I may be used. In this situation it should be ensured that light incident on the pick-up member I does not reach the storage member S and the shift register member SR. The charge transfer from the pick-up member I to the storage member S can now be effected directly from each pick-up element to the subjacent storage element, whereafter the charge transfer can be effected in the column direction in the storage member S to the shift register member SR. It should be noted that no charge transfer between the pick-up elements in the column direction is then required. In the case in which this feature is indeed present, it will become apparent from the further course of this description that such a situation has its advantages.

A further example of a construction of the sensor 1 is that in which the shift register SR is in the form of the base of a comb which is shielded from light and whose teeth constitute the storage member S. The pick-up elements of the pick-up member I are arranged in columns between the teeth of the storage member S. In this example the pick-up elements may have also a direct charge transfer to the adjacent, associated storage elements. A sensor having such a construction is sometimes referred to as an inter-line transfer device. If also here it is possible to transfer charge between the pick-up elements of the columns of the pick-up member I, this will have apparent advantages.

For simplicity of description of the camera shown in FIG. 1, the description will be based on the construction of the sensor 1 in the form of the frame transfer device shown. To control the sensor 1, it receives clock pulse signals denoted by C1, C2 to C5, which causes output terminals R, G and B of the sensor 1, which are coupled to the outputs of the shift registers SR1, SR2, and SR3, respectively, to carry a colour picture signal corresponding to red (R), green (G) and blue (B) coloured light components originating from a scene to be recorded. For the sake of simplicity, supply voltages for the sensor 1 and for further components in the camera in FIG. 1 are not shown. Furthermore for the sake of simplicity of FIG. 1, connection leads are shown singularly, but they may have a multiple design in practice and may comprise signal processing circuits.

According to FIG. 1 the scene information to be displayed originates from a scene which is shown as an arrow and is denoted by 2. Light coming from the scene 2 is projected onto the pick-up member I of the sensor 1 via an optical lens-system 3 which for the sake of simplicity is shown as a single lens and optical partial blocking devices 4 and 5. The devices 4 and 5 may be in the form of rotating disc shutters or of electronically controlled shutters which comprise, for example, liquid crystals. Depending on a voltage to be applied across the crystal, the crystal either entirely or partially transmits or blocks light.

When a scene is recorded the light originating from the scene 2 results in the scene forming an image on the pick-up member I of the sensor 1. It is assumed that a colour strip filter is present in front of the pick-up member I in one of the known manners, which filter has strips transmitting red, green and blue light. During a scene recording period the photons of the incident light produce an electric charge integration in each of the pick-up elements of the pick-up member I. The pick-up period is identical to a light integration period.

To process the scene information obtained by integration or accumulation in the pick-up member I, the clock pulse signals C1 to C5 are supplied by a time signal generator (TG) denoted by 6, more specifically a control circuit CS present therein for the image sensor 1. For a detailed structure of the various clock pulse signals reference is made to the said publication as an example.

To emphasize a control of the sensor 1 in a form deviating from one aspect of the present invention, the clock pulse signals for the control of the charge transfer in the members I, S and SR (signals C1, C3 and C5) and between the members I and S, S and SR (signals C2 and C4) are shown separately. Under the control of these clock pulse signals the sensor 1 supplies the colour picture signals R, G and B representing a scene information to be displayed.

In the case in which the signals R, G and B, after having been submitted to further signal processing operations which are customary for television, are used for television reproduction, the camera shown in FIG. 1 operates as a television camera. Another possibility is to process the signals R, G and B into a signal suitable for cinematographic reproduction so that the camera shown in FIG. 1 forms part of a cine film camera as a pick-up member. A further possibility is to process the signals R, G and B to form a photograph or a slide so that the camera of FIG. 1 forms part of a photographic camera as its pick-up member.

Independent of the specific camera construction, the camera shown in FIG. 1 may operate for black-white or colour recording. In the case of colour display, a plurality of sensors 1 may be present instead of the embodiment shown in Fig. 1 with a colour strip filter and the three shift registers SR1, SR2 and SR3.

According to FIG. 1 the colour picture signals R, G and B are applied to a pre-amplifier 7 succeeded by a change-over circuit (switch) 8. The time signal generator 6 applies a switching signal to a circuit input of the circuit 8 so that its output is alternately coupled to the signal inputs. It is assumed that during a switching period T1, the amplified colour signal R, G and B are passed on to a black level setting circuit denoted by 9 and that they are passed on during a switching period T2 to a black level setting circuit 10.

Figure 2:
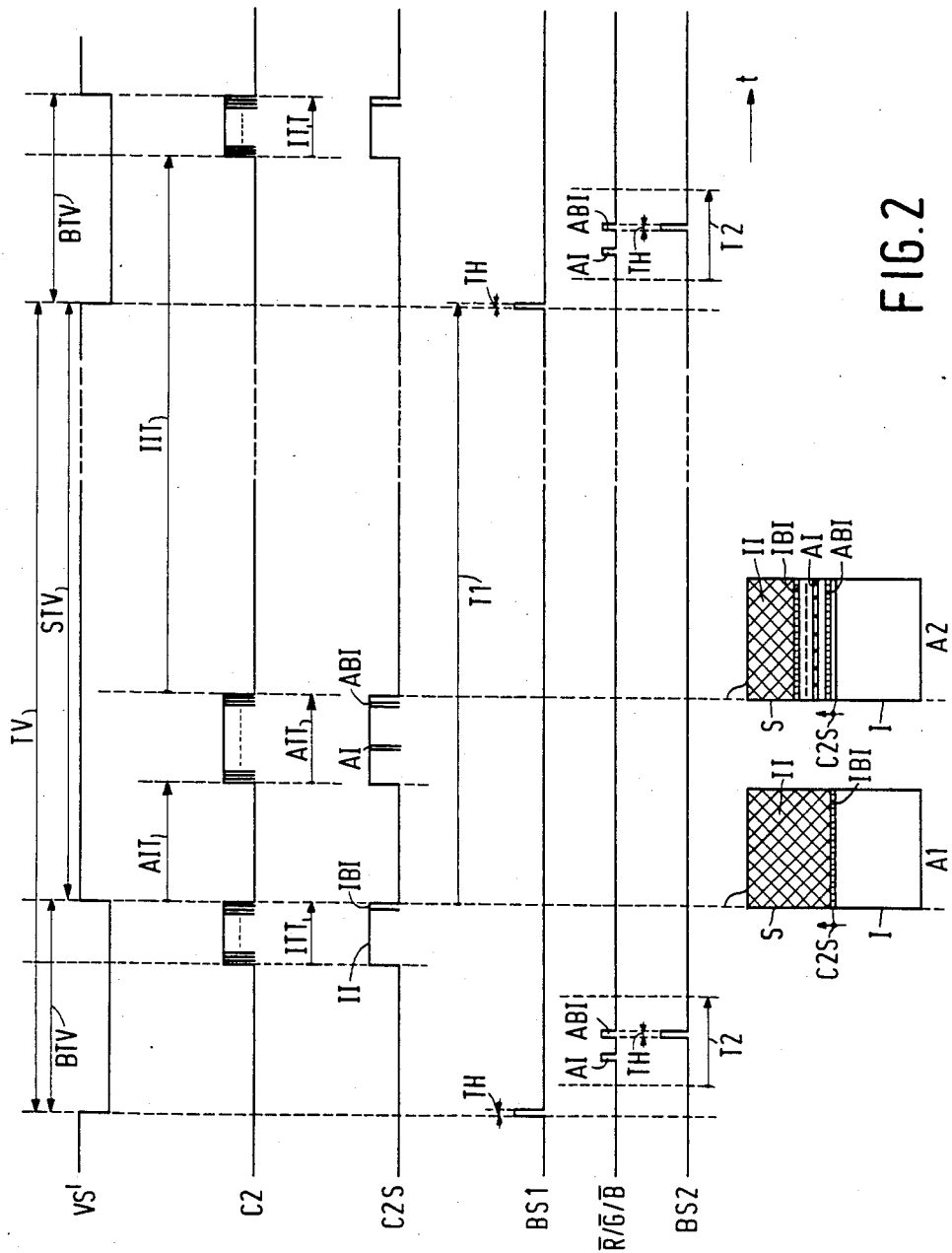
FIG. 2 shows some diagrams as a function of time to illustrate the invention.

In FIG. 2 which for the purpose of illustrating the operation of the camera according to FIG. 1 shows some time diagrams as a function of time t, the periods T1 and T2 are plotted. FIG. 1 shows that the circuit 10 receives colour signals $\overline{R}, \overline{G}$, and $\overline{B}$ for which a possible time diagram for a colour signal $\overline{R}, \overline{G}$ or $\overline{B}$ in FIG. 2 is denoted by $\overline{R/B/}$.

Together with a black level measuring circuit 11, the black level setting circuit 9 constitutes a black level control circuit (9,11) intended for the picture signals. The circuit (9, 11) is operative with a feedback, while a dark current gating pulse BS1 for the picture signal is applied in known manner from the time signal generator 6 to the measuring circuit 11. FIG. 2 shows a possible time diagram for the gating pulse BS1.

Similarly the black level setting circuit 10 and a black level measuring circuit 12 to which a dark current gating pulse BS2 (FIG. 2) is applied from the generator 6 constitute a black level control circuit (10, 12) which is, however, intended for the signal $\overline{R/B/}$ (FIG. 2) comprising an adjustment action information.

Figure 3:
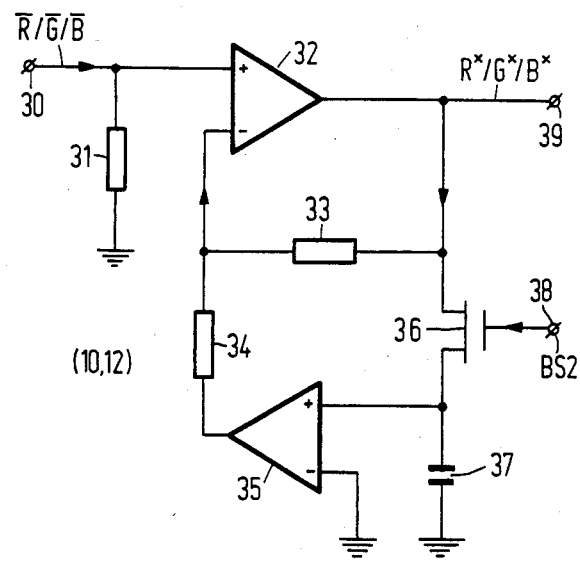
FIG. 3 shows in greater detail an embodiment of a black level control circuit suitable for the camera according to FIG. 1.

FIG. 3 shows a possible embodiment of a black level control circuit (9, 11) and/or (10, 12) more particularly for the latter. While a signal $\overline{R}, \overline{G}$ or $\overline{B}$ (the signal $\overline{R/G/B}$ of FIG. 2) is supplied, the circuit 10 supplies a signal $R^x$, $G^x$ or $B^x$ which is denoted by $R^x/G^x/B^x$ in FIG. 3.

A variable gain amplifier 13 applying signals R' G' and B' to three outputs succeeds the black level control circuit (9, 11) for the picture signal. It will be evident from the following description that the signals R', G' and B' are adjusted picture signals which have been adjusted as an example for a focus setting FC and a white balance setting WB.

Figure 4:
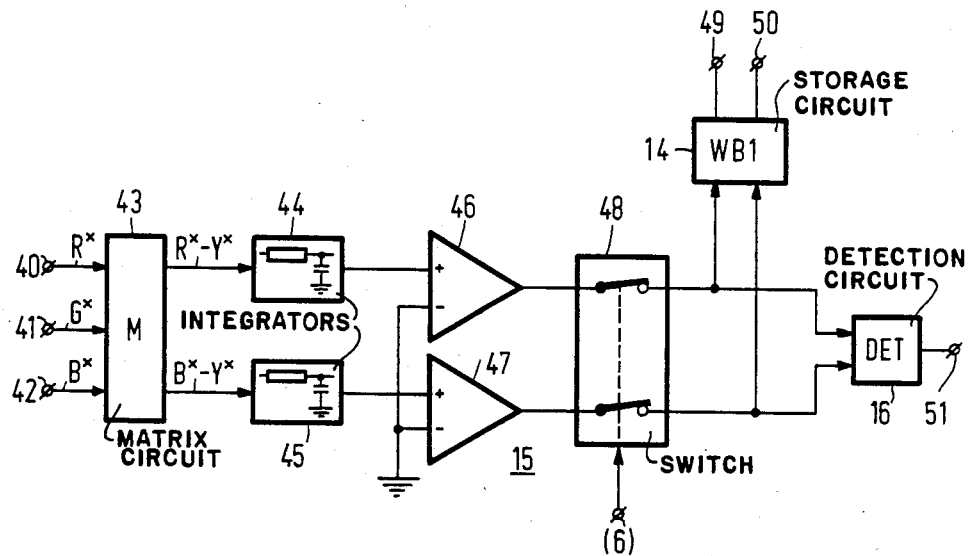
FIG. 4 shows a suitable detailed embodiment of a white balance control circuit.

For the white balance setting WB two inputs of the variable gain (adjustable) amplifier 13 are connected to outputs of a storage circuit (WB1) denoted by 14 for the amplification factors in the adjustable amplifier 13. Together with a comparison circuit 15 (COMP) to which the signals $R^x$, $G^x$ and $B^x$ are applied and a detection circuit 16 (DET) succeeding it, the storage circuit 14 constitutes a white balance control circuit (14, 15, 16), a possible more detailed embodiment of which is shown in FIG. 4. A signal which is not further indicated is applied from the time signal generator 6 to the comparison circuit 15 to determine the period of operation of the white balance control so as to achieve an optimum white balance setting WB which is detected by the circuit 16.

In this case the semi-blocking device 5 which is controlled through a control circuit 17 (WB2) from the time signal generator 6 can be used. The device 5 can alternately pass light originating from the scene 2 in an unimpeded manner and via a plate of, as it were, frosted glass. During the presence of the frosted glass plate in the optical path so that the scene information is mainly non-coloured and is more or less evenly picked up by the sensor 1, the white balance setting WB is adjusted.

After the optimum setting has been achieved, the detection circuit 16 applies a signal to a period setting circuit (TP) denoted by 18 which controls the time signal generator 6. Input and output leads of the circuit 18 are connected to a microprocessor ($\mu P$) denoted by 19. A television field or picture synchronizing signal VS and a television line synchronizing signal HS are applied to the circuit 18. Near the circuit 18 there is shown an adjustment and setting button 20 through which a given adjustment action program can be selected or composed. The program is fixed in a manner to be arbitrarily adjusted in an adjustment action control unit thus formed (18, 19).

For the purpose of adjusting the focus setting FC in the optical system of lenses 3, this system is coupled to a focus setting circuit (FC1) denoted by 21. For the focus setting FC the signal $G^x$ is used which is applied directly through a change-over circuit (switch) 22, and through a delay circuit 23 (T) to a comparison circuit (COMP) denoted by 24 which precedes the focus setting circuit 21. The time signal generator 6 applies signals not further indicated to a circuit input of the change-over circuit 22 to an input of the comparison circuit 24 for fixing the periodical period of a signal comparison.

Due to the fact that the output signal from the comparison circuit 24 is applied to the period setting circuit 18, this circuit ascertains whether an optimum focus setting has been achieved, whereupon the focus adjustment by means of a focus control circuit (22, 23, 24) thus formed is still switched on periodically, but does not have any consequences for the focus setting circuit 21. The periodical switch-on of the relevant adjustment is, for example, fixed in the action programme which is present in the adjustment action control unit (18, 19). This makes it possible to perform a periodical inspection of the adjustments.

Several adjustment actions may be considered for adjusting the focus setting FC. There is a possibility to have a camera construction with an additional periodically operative infra-red source detecting the infra-red radiation reflected by the scene 2. The optical semi-blocking device 4 is, for example, a filter in this case which passes alternately scene light in an unhindered manner and only received infra-red radiation.

To this end the camera of FIG. 1 is to be formed with a control circuit (FC2) denoted by 25 through which the device 4 is controlled from the time signal generator 6. Another solution is described in U.S. Pat. No. 4,381,223 in which the optical semi-blocking device 4 is present for partially blocking the optical path. This blocking action is effected alternately on first and second portions of the optical path, which portions are situated in substantially mutually opposite positions on either side of a central axis of the optical path.

By partially blocking the optical path, two images are obtained via different portions of the optical lens system 3. When focussing is at an optimum, the two images are optimally in registration. A non-optimum focussing position results in images which are shifted relative to each other, the direction of the shift depending on over or underfocussing. During the signal comparison operation with the aid of the circuit 24, the fact that the two images are shifted relative to each other is shown by a non-optimum signal correlation, and to obtain an optimum signal correlation the focus setting is modified in the correct direction through the circuit 21. The comparison circuit 24 receives the consecutively occurring adjustment action information components simultaneously through the change-over circuit 22 and the delay device 23.

The change-over circuit 22 is shown in FIG. 1 with a free contact for simple illustration of the switch-off state of the focus control circuit (22, 23, 24) when the white balance control circuit (14, 15, 16) is switched on.

To illustrate the advantage of the camera of FIG. 1 being able to operate with automatic adjustments which influence the normal picture signal generation as little as possible and which are performed periodically in the correct manner, reference is made to FIG. 2. FIG. 2 shows a television field period denoted by TV in which an interlaced system two or more field periods constitute one picture or frame period. In a non-interlaced system the period TV is also the picture period.

The period TV consists of a field scan period STV and a field blanking period BTV. The reference VS' denotes a field blanking signal which has been derived, for example, from the applied field synchronizing signal VS. FIG. 2 only shows the clock pulse signal C2 which ensures the information transfer between the pick-up member I and the storage member S of the sensor 1 of FIG. 1. Different periods can be defined by means of the clock pulse signal C2.

The reference IIT denotes a picture information integration period succeeded by an associated charge transfer period ITT. An adjustment action information integration period is denoted by AIT succeeded by an associated charge transfer period ATT. It appears that the periods IIT, ITT, AIT and ATT combined cover one field period TV.

The reference C2S in FIG. 2 denotes a transfer signal comprising the information transferred between the pick-up member I and the storage member S. The transfer signal C2S is shown with some information blocks, more specifically a block with a picture information II and an associated dark current information IBI and a block with an adjustment action information AI and an associated dark current information ABI separated therefrom. Prior and subsequent to the relevant information components AI and ABI in the information block (AI, ABI) there is no information or there is only information which is not utilized and which is irrelevant for the adjustment.

To illustrate the information blocks (II, IBI) and (AI, ABI) as they are present at given instants in the storage member S of the sensor 1, two images A1 and A2 thereof are shown in FIG. 2. In the first image A1 the picture information II and the associated dark current information IBI fill the storage member S completely. In the second image A2 the storage member S still comprises a part of the picture information II, the contiguous dark current information IBI and the separated adjustment action information AI and associated dark current information IBI.

Between the information components IBI and AI of the image A2 a broken line marks the instant when the period AIT ends. The adjustment action information AI may occur in one or more television lines in the storage member S and may originate from the same number of television lines of the pick-up member I.

To increase the contents of the adjustment action information, it is possible to add up information by increasing the clock pulse frequency of the signal C1 during the transfer period ATT by a factor of for example several tens as compared with the clock pulse frequencies of the signal C2 controlling the information transfer from the pick-up member I to the storage member S. As a result, information is added up in the row H294 of storage elements in the storage member S because information is transferred between the pick-up member I and the storage member S once is as many times as the frequency factor.

A frequency factor of forty is mentioned as an example. Consequently the information of forty rows of pick-up elements reaches a row of storage elements. During at least part of the transfer period ATT the higher clock pulse frequency factor may be present which applies relative to the same clock pulse frequency in the signals C3 and C4. For the information ABI which may be present in one row of elements of the storage member S it is assumed that it may originate from, for example, three rows of elements of the pick-up member I present under the strip BS of the sensor 1 of FIG. 1.

The information can be added without any further measures in the image sensor 1 when it is designed as a frame transfer device. In the case of an embodiment with the described underlying storage part or the described inter-line structure there should be a possibility to have charge transfer between the pick-up elements in the column direction.

FIG. 2 shows a time diagram of the dark current gating pulse BS1 for the picture information, which pulse covers, for example, one or more line periods TH or a part of a line period TH. The pulse BS1 occurring in FIG. 2 over one line period TH is present at the commencement of the field blanking period BTV. During the preceding field scan period STV and the duration of the pulse BS1 which together constitute the switching period T1, the pre-amplifier 7 is coupled through the change-over circuit 8 to the circuit 9 so that the signals R', G' and B' occur in known manner at the correct black level and the correct white balance.

FIG. 2 furthermore shows a time diagram of the dark current gating pulse BS2 for the adjustment action information. During the switching period T2 the pre-amplifier 7 is coupled via the change-over circuit 8 to the circuit 10 in this case. In relation to the period T2 the adjustment action information AI and the associated dark current information ABI are shown in the signal $\overline{R/B/}$. The signal $\overline{R/B/}$ illustrates that after the preceding adjustment action information integration period AIT in the pick-up member I each sensor output terminal R, G and B carries a signal having sequentially the adjustment action information AI and the associated dark current information ABI.

In the circuits 10 and 12, the information ABI ensures a correct black level clamping relative to which the correct value of the adjustment action information AI occurs in the focus control circuit (22, 23, 24) or in the white balance control circuit (14, 15, 16). The result of the relevant adjustment action can thereby be determined accurately.

In FIG. 1 the change-over circuit 8 is shown for obtaining an alternate coupling of the terminals with the signals R, G and B, with the black level control circuit (9, 11) for the picture signal and with the black level control circuit (10, 12) for the adjustment action signal. Instead of using the change-over circuit 8, the alternate coupling may be realised by means of gating signals for the circuits (9, 11) and (10, 12) originating from the time signal generator 6.

The following numbers are mentioned as examples. The period ATT may comprise thirteen line periods TH divided into 5TH without relevant information, 1TH with the information AI, 5TH without relevant information, 1TH with the information ABI and 1TH without relevant information. The preceding period AIT may be arbitrarily chosen dependent on the desired strength of the adjustment action information AI and on an addition of information used to a greater or lesser extent. Once the period AIT+ATT is selected for a given use of the camera, this period is fixed during use so that the period IIT does not change. Within the period AIT+ATT the limit between integration and transfer may be arbitrarily shifted or there may be several, separate adjustments. In this case it is important to maintain the period AIT+ATT as short as possible because this period is subtracted from the maximum possible picture information integration period which is normally equal to the period TV−ITT.

It is known that the period ITT is chosen to be equal to 8TH with the optical path being interrupted by the lens system 3 during the information transfer to prevent signal smear as a result of a continuing information integration during the period ITT. It follows that for the strength of the picture information generation a reduction factor occurs which is equal to the period IIT=TV−ITT−AIT−ATT divided by the period TV−ITT. Although the optical interruption during the period ITT may or may not be effected, such an interruption during the period ATT is necessary in practice in the case of the focus adjustment.

For the period T2 there may apply that T2=7TH in which the information components AI and ABI may each occur spreaded in 1TH. The periods T2 and ITT combined should be shorter that the field blanking period BTV for which in accordance with television standards there may apply that BTV=21TH or BTV=25TH dependent on the television standard with TV =262.5TH or TV=312.5TH.

It follows from the foregoing that it is required to perform field synchronization for obtaining picture information and adjustment action information generations which do not disturb each other. This synchronization can easily be realised by applying the field synchronizing signal VS to the period setting circuit 18 of FIG. 1.

FIG. 3 shows an embodiment of the black level control circuit (10, 12) which is sufficiently fast under the supply of the signal $\overline{R/B/}$ and the dark current gating pulse BS2 shown in FIG. 2. An input terminal 30 is connected to ground via a cable terminating resistor 31 and is furthermore connected to a (−) input of a differential amplifier 32. A (−) input of the amplifier 32 is connected via a feedback resistor 33 to the output thereof and is connected through a resistor 34 to the output of a further differential amplifier 35. The (−) input of the amplifier 35 is connected to ground and the (+) input is connected via a transistor 36 to the output of the amplifier 32 and via a capacitor 37 to ground. The transistor 36 is of the type having an isolated gate electrode. A source electrode of the transistor 36 is connected to the (+) input of the amplifier 35 and a drain electrode is connected to the output of the amplifier 32, while the gate electrode is connected to an input 38 to which the gating pulse BS2 is applied.

The gating pulses BS2 have, for example, pulses occurring from a negative voltage to the ground potential with the period TH or a fraction thereof. The periodical pulses of the period TH render transistor 36 conducting. The result of a clamping circuit (32–38) thus formed is that the ground potential during the period TH occurs at the output of the amplifier 32. A deviation thereof which may be present at the beginning of the period TH is corrected because the amplifier 35, which is operative as a differential amplifier, supplies such a current to the (−) input of the amplifier 32 that the ground potential occurs at its output.

The feedback clamping circuit (32–38), whose amplification factor is equal to one, supplies the signal $R^x/G^x/B^x$ to an output 39 for further processing for the relevant adjustment.

FIG. 4 shows a possible embodiment of the white balance control circuit (14, 15, 16) of FIG. 1. The respective signals $R^x$, $G^x$ and $B^x$ are applied via input terminals 40, 41 and 42 to a matrix circuit 43 (M). The matrix circuit 43 supplies, for example, colour difference signals $R^x-Y^x$ and $B^x-Y^x$ for which there applies that $Y^x=0.3$, $R^x+0.59$ $G^x+0.11$ $B^x$. The colour difference signals $R^x-Y^x$ and $B^x-Y^x$ are applied via respective signal integration circuits 44 and 45 to (+) inputs of respective differential amplifiers 46 and 47 whose (−) inputs are connected to ground. The outputs of the differential amplifiers 46 and 47 are connected to a switch-on/off circuit 48 which is controlled via a circuit input from the time signal generator 6 of FIG. 1.

The storage circuit 14 and the detection circuit 16 succeed the change-over circuit 48, which together with the components 43, 44, 45, 46 and 47, constitutes the comparison circuit 15 of FIG. 1. Two output terminals 49 and 50 of the circuit 14 carry voltages which determine the amplification factors of the adjustable amplifier 13 of FIG. 1. Upon detection of the ground potential at both inputs an output 51 of the detection circuit 16 gives the indication to the period setting circuit 18 of FIG. 1 that the white balance setting WB is at an optimum.

What is claimed is:

1. A camera for recording television, photographic or cinematographic images, including a solid-state image sensor designed as a charge transfer device comprising a pick-up member, a storage member and a parallel-in, series-out shift register member coupled to at least one sensor output terminal, said storage and shift register members being shielded from incident light and said pick-up member being shielded over a strip from incident light, said camera having a control circuit for the image sensor for obtaining at the sensor output terminal a picture signal having a periodical picture information associated with a scene to be recorded and a dark current information originating from below the said strip, said picture signal being obtained after a picture information integration period in the pick-up member and a charge transfer period for the transfer between pick-up member and storage member, characterized in that beyond the said picture information integration period and subsequent charge transfer period and after an adjustment action information integration period in the pick-up member the control circuit for the image sensor is operative for obtaining at the sensor output terminal a signal having sequentially the adjustment action information and the associated dark current information.

2. A camera as claimed in claim 1, characterized in that the camera includes a time signal generator comprising the control circuit for applying distinct clock pulse signals to various outputs for the information transfer in and between the parts of the sensor, the pick-up member and the storage member are coupled to distinct clock pulse outputs during a transfer period with an information transfer between the pick-up member and the storage member, said period succeeding the adjustment action information integration period, the frequency of the clock pulses for the information transfer in the pick-up member is higher than that in the storage member during at least part of the transfer period, the information being transferred between the pick-up member and the storage member under the control of the clock pulses for the information transfer in the storage member.

3. A camera as claimed in claim 1 or 2, characterized in that the camera includes a period setting circuit through which the control circuit for the image sensor is operative for generating the picture information or for generating the adjustment action information, both with the associated dark current information, said period setting circuit having an input for applying a television field or picture synchronising signal.

4. A camera as claimed in any one of the preceding claims, characterized in that at least one sensor output terminal is alternately coupled to a first black level control circuit for the picture signal and to a second black level control circuit for the signal comprising the adjustment action information and the associated dark current information.

5. A camera as claimed in claim 4, characterized in that a focus control circuit succeeds the second black level control circuit for the said signal for automatically adjusting an optical lens system present at the camera and positioned in front of the pick-up member of the image sensor.

6. A camera as claimed in claim 4 or 5, characterized in that in a camera suitable for colour recording a white balance control circuit succeeds the second black level control circuit for the said signal, which white balance control circuit has a storage circuit for the amplification factors for an adjustable amplifier which succeeds the first black level control circuit for the picture signal.

7. A camera for recording images, said camera comprising:
   a solid state charge transfer image sensor device having a pickup member, a storage member, and a parallel-in, series-out shift register member coupled to a sensor output terminal, said image sensor device comprising first shield means arranged over the storage member to shield said storage member from incident light, said image sensor device comprising second shield means arranged over the shift register member to shield said shift register member from incident light, said image sensor device comprising a third shield means arranged over a strip of the pickup member to shield the strip from incident light; and
   a control circuit for controlling the image sensor device, said control circuit causing the image sensor device to produce at its output terminal a picture signal representing periodic picture information associated with a scene to be recorded and dark current information representing the dark current beneath the shielded strip of the pickup member, said control circuit causing the image sensor device to produce the picture signal after a picture integration period in which picture information is integrated in the pickup member and after a charge transfer period in which the picture information integrated in the pickup member is transferred to the storage member;
   characterized in that the control circuit also causes the image sensor device to produce at its output terminal an adjustment action signal representing adjustment action information followed by dark current information associated with the adjustment action information, said control circuit causing the image sensor device to produce the adjustment action signal after an adjustment action information integration period in which adjustment action information is integrated in the pickup member, said adjustment action information integration period following the charge transfer period.

8. A camera as claimed in claim 7, characterized in that during the charge transfer period, picture information is transferred in the pickup member at a first frequency and picture information is transferred in the storage member at a second frequency, the first frequency exceeding the second frequency during at least part of the charge transfer period.

* * * * *